(12) United States Patent
Takagi et al.

(10) Patent No.: US 8,228,439 B2
(45) Date of Patent: Jul. 24, 2012

(54) RECEIVING APPARATUS AND TELEVISION RECEIVER

(75) Inventors: Toshihiro Takagi, Daito (JP); Yasuhiro Inui, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1256 days.

(21) Appl. No.: 11/546,439

(22) Filed: Oct. 12, 2006

(65) Prior Publication Data

US 2007/0085933 A1    Apr. 19, 2007

(30) Foreign Application Priority Data

Oct. 13, 2005    (JP) ................................. 2005-299163

(51) Int. Cl.
*H04N 5/50* (2006.01)
(52) U.S. Cl. ....................................................... 348/725
(58) Field of Classification Search .................. 348/725, 348/552–555, 563–564, 569, 473
See application file for complete search history.

(56) References Cited

U.S. PATENT DOCUMENTS

| | | | | |
|---|---|---|---|---|
| 5,495,282 A * | 2/1996 | Mostafa et al. | ................ | 725/21 |
| 5,572,213 A * | 11/1996 | Noneman et al. | ............... | 342/13 |
| 5,740,202 A * | 4/1998 | Mortensen et al. | ........... | 375/326 |
| 6,084,645 A * | 7/2000 | Park et al. | ....................... | 348/734 |
| 6,154,257 A * | 11/2000 | Honda et al. | ................... | 348/558 |
| 6,359,580 B1 * | 3/2002 | Morrison | ........................ | 348/731 |
| 6,678,005 B2 * | 1/2004 | Anderson et al. | .............. | 348/553 |
| 7,298,424 B2 * | 11/2007 | Oh | .................................. | 348/706 |
| 7,518,659 B2 * | 4/2009 | Iizuka et al. | ................... | 348/584 |
| 7,831,988 B2 * | 11/2010 | Ishida | .............................. | 725/46 |
| 2007/0241990 A1 * | 10/2007 | Smith et al. | ........................ | 345/5 |

FOREIGN PATENT DOCUMENTS

| | | |
|---|---|---|
| JP | 2004-032231 A | 1/2004 |
| JP | 2004-343730 A | 12/2004 |
| JP | 2005-218002 A | 8/2005 |

* cited by examiner

*Primary Examiner* — Paulos Natnael
(74) *Attorney, Agent, or Firm* — Crowell & Moring LLP

(57) ABSTRACT

A television receiver having: an external input terminal to receive a non-RF signal from a first external device, the non-RF signal being a video and/or audio signal which is not modulated into a radio frequency signal; an RF input terminal to receive an RF signal from a second external device, the RF signal being generated by modulating a video and/or audio signal, and an external-input switching unit to perform switching selection to the non-RF signal received through the external input terminal, wherein the external-input switching unit is capable of tuning in a frequency of RF signal transferred through the RF input terminal to perform switching selection to a receiving channel when the detecting unit detects that an RF signal has been transferred through the RF input terminal.

10 Claims, 5 Drawing Sheets

RECEIVING APPARATUS AND TELEVISION RECEIVER

CROSS-REFERENCE TO RELATED APPLICATION

The present U.S. patent application claims a priority under the Paris Convention of Japanese patent application No. 2005-299163 filed on Oct. 13, 2005, and shall be a basis of correction of an incorrect translation.

BACKGROUND OF THE INVENTION

1. Field of the Invention

The present invention relates to a receiving apparatus and television receiver.

2. Description of Related Art

Various types of receiving apparatuses for receiving broadcast signals have been used, such as television receivers which can receive digital broadcast signals and analog broadcast signals (for example, refer to JP 2004-032231A), and a set top box which enables to select a channel to receive a desired broadcast signal (for example, refer to JP 2004-343730A).

Further, in the receiving apparatuses such as the above-described television receivers, a set top box or the like, a newly developed apparatus which is provided with a plurality of external input terminals for connecting with external devices and has an external-input switching function to input a video and/or audio signal output from a desired external device through the external input terminals by selecting an external device to be used corresponding to every external input terminal, has been developed (for example, refer to JP 2005-218002A).

However, some external devices output a video and/or audio signal as a broadcast signal (RF signal) of a certain channel (for example, regular broadcast Channel 3 and Channel 4 in U. S.). In order to receive a picture by receiving such RF signal output from the external device with the receiving apparatus, it is necessary to connect the external device with the receiving apparatus and further to tune to a frequency of RF signal. Therefore, the above-described external-input switching function cannot select the external device which outputs RF signal, and demands a user to execute a separate operation to tune to a frequency of RF signal of a channel, which causes a problem that involves troublesome operation.

SUMMARY OF THE INVENTION

An object of the present invention is to provide a receiving apparatus and a television receiver which enhance user-friendliness in selecting data output from an external device.

In order to solve the problem, according to a first aspect of the invention, the television receiver comprises: an external input terminal to receive a non-RF signal from a first external device, the non-RF signal being a video and/or audio signal which is not modulated into a radio frequency signal; an RF input terminal to receive an RF signal from a second external device, the RF signal being generated by modulating a video and/or audio signal, and an external-input switching unit to perform switching selection to the non-RF signal received through the external input terminal, and the television receiver further comprises:

a detecting unit to judge at a predetermined timing whether or not an RF signal has been transferred through the RF input terminal, wherein the external-input switching unit is capable of tuning in a frequency of RF signal transferred through the RF input terminal to perform switching selection to a receiving channel when the detecting unit detects that an RF signal has been transferred through the RF input terminal;

a selection unit to judge whether or not the external-input switching unit has been given a function of tuning in a frequency of RF signal transferred from RF input terminal to switch a receiving channel; and a channel selecting unit to tune to a frequency of RF signal transferred from RF input terminal to select a receiving channel.

In the above television receiver, since the external-input switching unit is capable of tuning to a frequency of RF signal transferred from RF input terminal, the user is not required to execute a separate manipulation to tune in on a frequency of RF signal to select a receiving channel, even if data transferred from the second external device is selected from among data transferred from the first external device and the second external device. The receiving channel can be selected only by using the external-input switching unit, and therefore, user-friendliness of the television receiver is enhanced.

The detecting unit of the television receiver judges at a predetermined interval whether or not RF signal has been transferred from RF input terminal. When the detecting unit determines that RF signal has been transferred from RF input terminal, the external-input switching unit tunes in a frequency of RF signal to switch to a receiving channel. Therefore, the user is allowed to switch to his or her desired channel only when necessary, and an easy-to-use television receiver is provided.

Further, the television receiver comprises the selection unit to judge whether or not the external-input switching unit has been given a function of tuning in a frequency of RF signal transferred from RF input terminal to switch a receiving channel, and the channel selecting unit for tuning in a frequency of RF signal transferred from RF input terminal to select a receiving channel. Therefore, a user-friendly television receiver can be provided.

According to a second aspect of the invention, the receiving apparatus comprises:

an external input terminal to receive a non-RF signal from a first external device, the non-RF signal being a video and/or audio signal which is not modulated into a radio frequency signal; an RF input terminal to receive an RF signal from a second external device, the RF signal being generated by modulating a video and/or audio signal, and an external-input switching unit to perform switching selection to the non-RF signal received through the external input terminal, wherein the external-input switching unit is capable of tuning in a frequency of RF signal transferred through the RF input terminal to perform switching selection to a receiving channel when the detecting unit detects that an RF signal has been transferred through the RF input terminal.

In the above receiving apparatus, the external-input switching unit is capable of tuning in a frequency of RF signal transferred from RF input terminal to switch to a receiving channel. Therefore, the user is not required to execute a separate manipulation to tune in on a frequency of RF signal to select a receiving channel, even if data transferred from the second external device is selected from among data transferred from the first external device and the second external device. The receiving channel can be selected only by using the external-input switching unit, and therefore, user-friendliness of the receiving apparatus is enhanced.

In the second aspect of the invention, preferably, the receiving apparatus further comprises a detecting unit to judge at a predetermined timing whether or not an RF signal has been transferred through the RF input terminal, wherein the external-input switching unit is capable of tuning in a frequency of RF signal transferred through the RF input terminal to perform switching selection to a receiving channel when the detecting unit detects that an RF signal has been transferred through the RF input terminal.

Further, the user can enjoy additional advantages with use of the above receiving apparatus. That is, since the detecting unit judges at a predetermined interval whether or not an RF signal has been transferred from RF input terminal, the external-input switching unit tunes in a frequency of RF signal to switch to a receiving channel, when the detecting unit determines that RF signal has been transferred from RF input terminal. Therefore, the user can switch to his or her desired channel only when necessary, and user-friendliness of the receiving apparatus is improved.

In the second aspect of the invention, preferably, the receiving apparatus further comprises a selection unit to judge whether or not the external-input switching unit has been given a function of tuning in a frequency of RF signal transferred from RF input terminal to switch a receiving channel.

Further, the user can enjoy further additional advantages with use of the above receiving apparatus. That is, since the receiving apparatus has the selection unit to judge whether or not the external-input switching unit has been given a function of tuning in a frequency of RF signal transferred from RF input terminal to switch a receiving channel, an easy-to-use receiving apparatus is provided.

In the second aspect of the invention, preferably, the receiving apparatus further comprises a channel selecting unit to tune to a frequency of RF signal transferred from RF input terminal to select a receiving channel.

Further, the user can enjoy additional advantages with use of the above receiving apparatus. That is, since the receiving apparatus is provided with the channel selecting unit for tuning in a frequency of RF signal transferred from RF input terminal to select a receiving channel, an easy-to-use receiving apparatus is available.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein.

THE PREFERRED EMBODIMENT OF THE INVENTION

Now, embodiments of the present invention will be described in detail with reference to the accompanying drawings. As an embodiments of the invention, a television receiver for receiving a television broadcast signal will be described.

Figure 1:
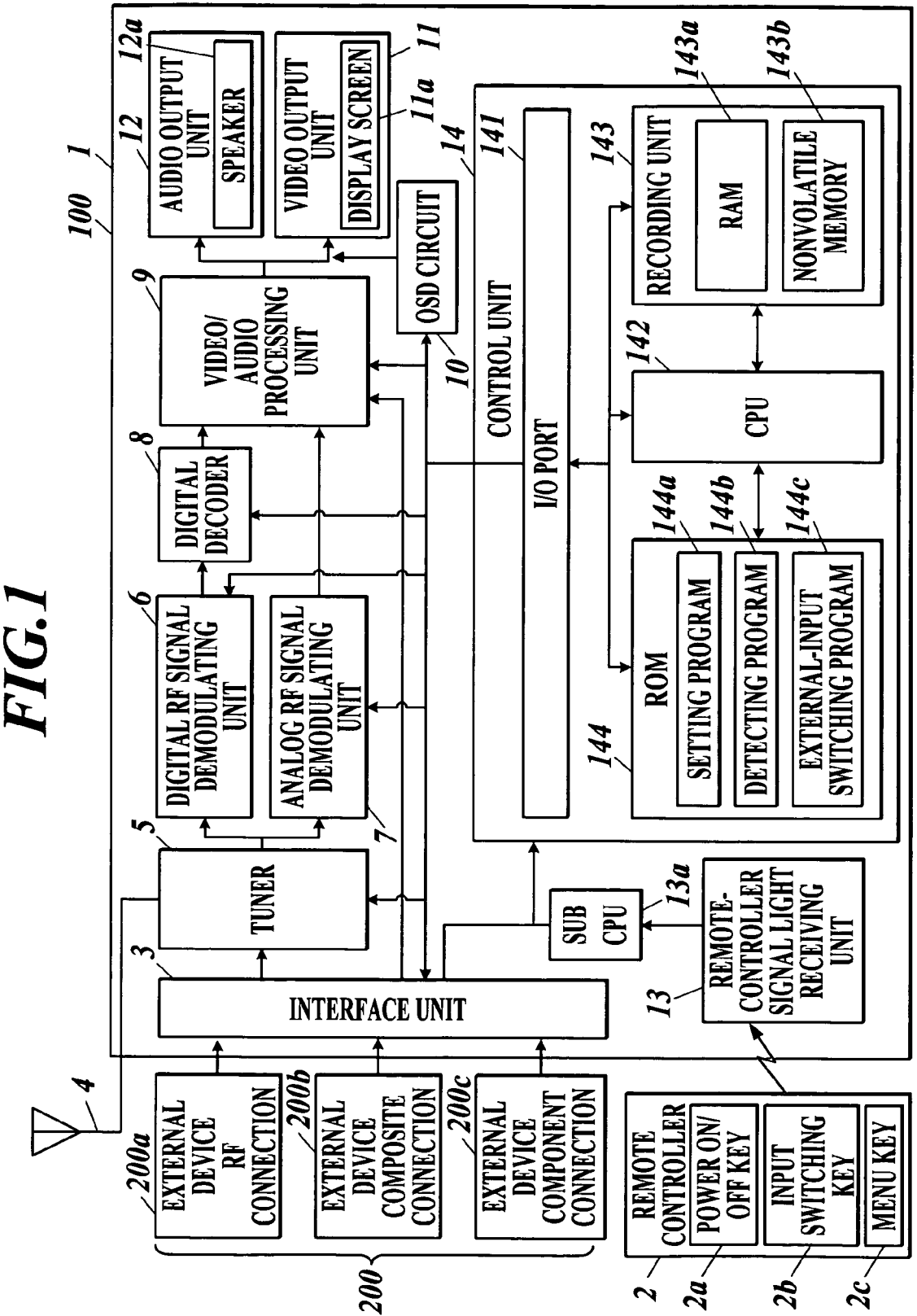
FIG. 1 is a block diagram illustrating an embodiment of a main circuit configuration of a television receiver according to the present invention, to which external devices are connected.

FIG. 1 is a block diagram illustrating, by way of example, a circuit configuration of the television receiver with external devices connected thereto, according to the embodiment of the invention.

As shown in FIG. 1, a television receiver 100 is designed to receive, for example, digital and analog television broadcast signals (hereinafter, "digital/analog RF signal"). The television receiver 100 comprises a receiver body 1 for outputting a video signal and audio signal based on the received digital/analog FR signal, and a remote controller 2 operated by a user to input various instruction to the receiver body 1, thereby remotely controlling the same.

Further, the television receiver 100 can be connected with plural external devices 200, and performs predetermined process on video and/or audio signals transferred from the external devices 200 to generate video and/or audio signals.

The television receiver 100 can be connected with the external devices 200, for example, such as a second external device 200a, first external device 200b, and third external device 200c. The second external device 200a outputs RF signal of a specific frequency, which is generated based on a video and/or audio signal. The first external device 200b outputs a composite signal including a luminance signal (Y) and chrominance signal (C) generated based on a video signal. The third external device 200c outputs a component signal including a luminance signal (Y), B-Y color-difference signal (Cb(Pb)), and R-Y color-difference signal (Cr(Pr)) based on a video signal. Each external device 200 is connected to the receiver body 1 through an interface unit 3, and outputs a video and/or audio signal to the receiver body 1.

More specifically, the external device 200a, which outputs FR signal having a specific frequency based on a video and/or audio signal, comprises, for example, game machines and the like. The external device 200a converts the video and/or audio signal into RF signal of a specific frequency, and supplies the RF signal to the receiver body 1 through RF input terminals (external input terminals) 31a, 31a (refer to FIG. 2).

Figure 2:
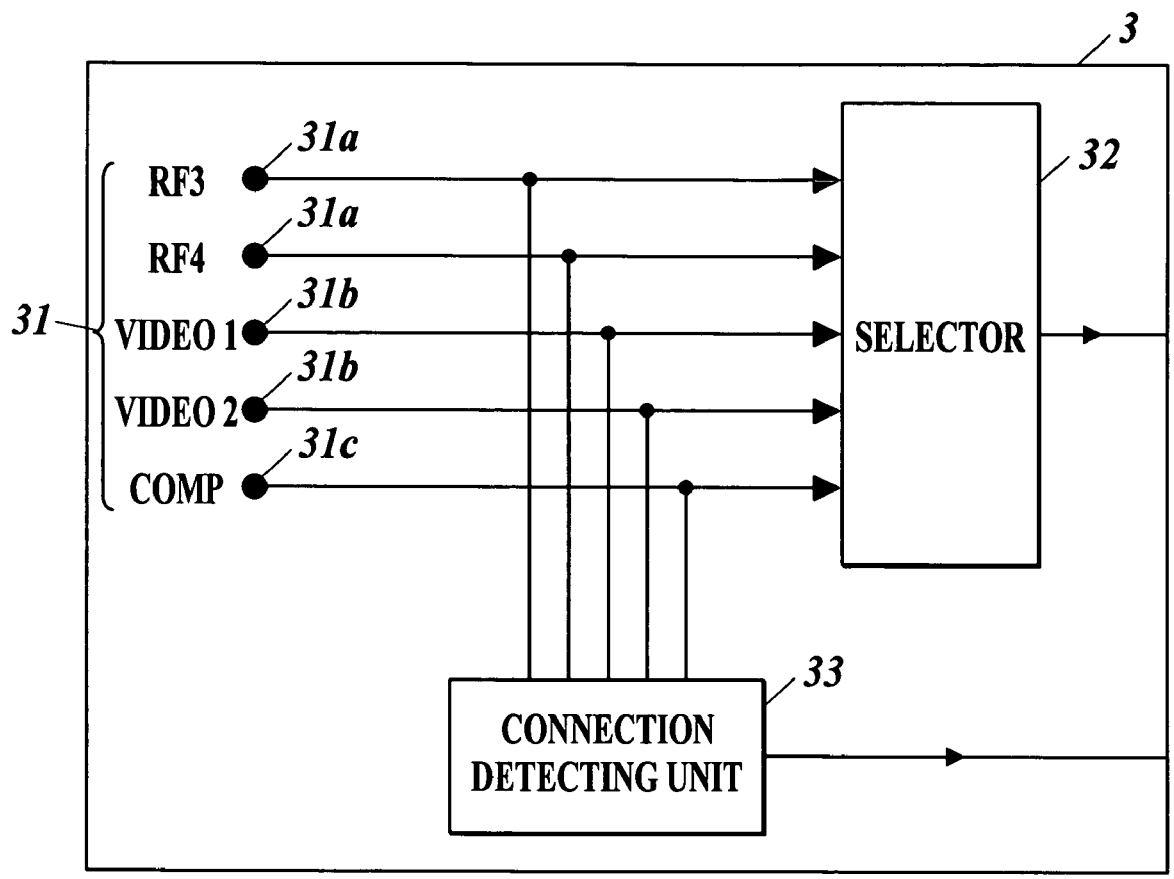
FIG. 2 is a view illustrating an embodiment of a main portion of an interface unit.

The external device 200b, which outputs a composite signal, comprises VCR (video cassette recorder) and the like, and supplies the composite signal to the receiver body 1 through composite input terminals (external input terminals) 31b, 31b (refer to FIG. 2).

The external device 200c, which outputs a component signal, comprises, for example, DVD (Digital Versatile Disc) player and the like, and supplies the component signal to the receiver body 1 through a component input terminal (external input terminal) 31c.

The remote controller 2 is provided with a power on/off key 2a for turning on or turning off the power supply of the television receiver 100, an input switching key 2b serving as an external-input switching unit for switching or selecting a video signal and/or audio signal input through the input terminals 31 (FIG. 2), and a menu key 2c for displaying various menu screens on a display screen 11a. Further, the remote controller 2 is provided with a channel key (not shown) for tuning in RF signal of a predetermined frequency whereby a desired broadcast channel is selected, a channel up/down key (not shown) for switching a broadcast channel from one to other, and a volume up/down key (not shown) for controlling a sound volume. When one of the keys provided on the remote controller 2 is manipulated or pressed, an input operation signal (infrared ray signal) corresponding to the operated key is output from an infrared-emitting diode and the like (not shown). The input operation signal is transferred to a control unit 14 through a remote-controller signal light receiving unit 13.

The receiver body 1 comprises the interface unit 3 through which the external devices are connected to the receiver body 1, an antenna 4 for receiving a digital/analog RF signal, a tuner 5 connected to the antenna 4, and the interface unit 3 for receiving RF signal of a predetermined frequency from the antenna 4 or from the external devices 200*a* which outputs RF signal. The receiver body 1 further comprises a digital RF signal demodulating unit 6 for demodulating a digital RF signal supplied from the tuner 5, an analog RF signal demodulating unit 7 for demodulating an analog RF signal supplied from the tuner 5, and a digital decoder 8 for decoding the digital RF signal demodulated by the digital RF signal demodulating unit 6. Further, the receiver body 1 comprises a video/audio processing unit 9, OSD circuit 10, a video output unit 11, an audio output unit 12, the remote-controller signal light receiving unit 13, and the control unit 14. The video/audio processing unit 9 performs a predetermined process on a video/audio data based on RF signal supplied from the analog RF signal demodulating unit 7 or from the digital decoder 8, or on a video/audio data supplied from the external device 200*b* for outputting a composite signal or from the external device 200*c* for outputting a component signal. OSD circuit 10 adds OSD data to a video signal processed by the video/audio processing unit 9. The video output unit 11 outputs a video signal processed by the video/audio processing unit 9, and the audio output unit 12 outputs an audio signal processed by the video/audio processing unit 9. The remote-controller signal light receiving unit 13 receives an input operation signal sent from the remote controller 2 and outputs the received input operation signal to the control unit 14, and the control unit 14 controls whole operation of the receiver body 1 in accordance with the input operation signal received from the remote-controller signal light receiving unit 13.

As shown in FIG. 2, the interface unit 3 comprises plural input terminals 31, a selector 32 serving as an external-input switching unit, and a connection detecting unit 33 serving as a detecting unit. The selector 32 is selectively connected with either of the input terminals 31 based on a control signal sent from the remote controller 2 through the control unit 14, whereby a video and/or audio signal is received from the external device connected to the selector 32 through the selected input terminal. The connection detecting unit 33 detects a signal sent from the input terminals 31 to judge which one of the external devices 200 is connected, whereby, in particular, RF signal supplied from the input terminal 31*a*, 31*a* is detected. The input terminals 31 include two RF input terminals (for example, RF3, RF4) for connecting the external device 200*a* to the selector 32 (RF connection), two composite input terminals (for example, Video 1, video 2) for connecting the external device 200*b* to the selector 32 (Composite connection), and a component input terminal 31*c* (for example, COMP) for connecting the external device 200*c* to the selector 32.

More particularly, when the user operates the input switching key 2*b* of the remote controller 2, an input operation signal is transferred to the selector 32 through the control unit 14, whereby a signal is switched to a video and/or audio signal from the external device 200. The selector 32 successively switches the input terminals 31 to be connected every user's pressing operation of the input switching key 2*b*. The input terminals 31 connected in response to the pressing operation of the input switching key 2*b* are displayed on the display screen 11*a* (OSD display). Referring to the OSD display on the display screen 11*a*, the user selects his or her desired external device 200 connected to the input terminals 31, and switches a signal to a video and/or audio signal transferred from the selected external device 200 through the input terminal 200.

The connection detecting unit 33 detects or judges whether or not a signal (for example, a synchronizing signal) is transferred from the input terminal 31, whereby detecting or judging whether or not the external device 200 is connected with either of input terminals 31, and outputting the result of the detection to the control unit 14. For instance, when it is determined that a synchronizing signal is sent from the input terminal 31, the connection detecting unit 33 outputs a detection signal of "H" to the control unit 14. When no synchronizing signal is detected, the connection detecting unit 33 outputs a detection signal of "L" to the control unit 14.

The antenna 4 is installed out of doors so as to face in a predetermined direction to receive a digital/analog RF signal of a radio frequency sent from a television broadcast station (not shown).

The tuner 5 comprises a high frequency amplifier circuit (not shown), and a frequency converting circuit (not shown) including a local oscillator (not shown) and a frequency mixer (not shown). The local oscillator is controlled by the control unit 14 to generate a predetermined oscillation signal. In other words, the local oscillator generates a local oscillation signal for tuning in RF broadcast signal of desired TV channel or TV broadcast station based on a control signal sent from the control unit 14. In the tuner 5, a digital/analog RF signal transferred from the antenna 4 or a digital/analog RF signal sent from the external device 200*a* through RF input terminal 31*a* is mixed with the local oscillation signal output from the local oscillator controlled by the control unit 14 to generate an intermediate frequency signal (IF signal), whereby a digital/analog RF signal of the desired channel or a digital/analog RF signal of the tuned in channel is received. The intermediate frequency signal converted by the tuner 5 is supplied to the digital RF signal demodulating unit 6 or to the analog RF signal demodulating unit 7.

The digital RF signal demodulating unit 6 executes a predetermined process, including an amplifying process, a demodulating process, and a correction process, on the IF signal supplied from the tuner 5 in accordance with a control signal sent from the control unit 14, whereby a transport stream (TS) is generated, and further the transport stream is divided into a video stream, audio stream in MPEG 2 format (Moving Picture Exports Group 2) and SPI/SI (Program Specific Information/Service Information). The video stream and audio stream are further supplied to a digital decoder 8, and data included in SPI/SI is supplied to the control unit 14.

The analog RF signal demodulating unit 7 amplifies and demodulates IF signal supplied from the tuner 5, whereby video data and audio data are generated. The video data and audio data are further supplied to the video/audio processing unit 9.

The digital decoder 8 comprises a video decoder (not shown) and audio decoder (not shown). The video decoder decodes the video stream supplied from the digital RF signal demodulating unit 6, and thereby the video stream is subjected to a reverse DCT and motion compensation to generate video data. Meanwhile, the audio decoder decodes the audio stream supplied from the digital RF signal demodulating unit 6 to generate audio data. The video data and audio data generated respectively by the video decoder and audio decoder are transferred to the video/audio processing unit 9.

The video/audio processing unit 9 executes various processes, including D/A converting process, on the video data and audio data supplied respectively from the digital decoder 8 and analog RF signal demodulating unit 7 to generate a video signal and audio signal. Further, the video data and/or audio data supplied from the external device 200b (composite connection) and external device 200c (component connection) are subjected to various processes including D/A converting process, whereby a video signal and audio signal are generated. The generated video signal and audio signal are supplied to the video output unit 11 and audio output unit 12, respectively.

In response to a control signal from the control unit 14, OSD circuit 10 combines OSD data recorded on ROM 144 with the video signal supplied from the video/audio processing unit 9.

The video output unit 11 is provided with the display screen 11a such as CRT (Cathode Ray Tube) and LCD (Liquid crystal Display), and displays a video on the display screen 11a based on the video signal supplied from the video/audio processing unit 9.

The audio output unit 12 is provided with, for example, a speaker 12a and the like, and outputs through the speaker 12a a sound based on the audio signal input from the video/audio processing unit 9.

The remote-control signal light receiving unit 13 receives an input operation signal output by operation of the various keys provided on the remote controller 2, and makes a subsidiary CPU 13a execute processes on the input operation signal, including an amplifying process, detecting process and error correction process, in accordance with the received input operation signal, and then outputs the processed input operation signal to the control unit 14.

The control unit 14 is provided with I/O port 141, CPU (Central Processing Unit) 142, recording unit 143, and ROM (Read Only Memory) 144.

In response to an input signal input from various units in the receiver body 1 through I/O port 141, and/or an input operation signal generated depending on operation of the key on the remote controller 2 and supplied through the remote-control signal light receiving unit 13 and I/O port 141, CPU 142 runs various programs recorded on ROM 144, and outputs control signals to various units in the receiver body 1 through I/O port 141, thereby controlling whole operation of the receiver body 1.

The recording unit 143 is provided with RAM (Random Access Memory) 143a, and stores on RAM 143a input data and results obtained when CPU 142 executes the various programs. The recording unit 143 is further provided with a nonvolatile memory 143b, such as EEPROM (Electrically Erasable ROM), flash memory, and the like, and stores on the nonvolatile memory 143b setting conditions determined when a setting program 144a is executed.

ROM 144 stores the setting program 144a, a detecting program 144b and external-input switching program 144c.

The setting program 144a serves, for example, to make CPU 142 execute a function of prompting the user to determine upon execution of external-input switching operation whether or not to tune in on a frequency of RF signal which is input from the external device connected to RF input terminal 31a through RF input terminal 31a to switch a receiving channel.

More specifically, when the user presses the menu key 2c of the remote controller 2, CPU 142 makes OSD circuit 10 add OSD data of the menu screen to the video signal and display the same on the display screen 11a for prompting the user to determine whether or not to switch a channel of RF signal sent from RF input terminal 31a, when the external-input switching program 144c is executed to switch an external input signal, as will be described below. When the external-input switching program 144c is executed to switch the external input signal, CPU 142 stores on the nonvolatile memory 143b a setting condition for determining whether or not to switch a channel of RF signal, based on a setting condition for determining whether or not to switch a channel of RF signal selected on the menu screen by operation of remote controller 2. When the user sets a condition of switching a channel of RF signal, the channel of RF signal input through the RF input terminal 31a is switched by execution of external-input switching operation. Meanwhile, when the user sets a condition of not switching a channel of RF signal, the channel of RF signal is not switched by execution of external-input switching operation.

Further, the setting program 144a serves, for example, to make CPU 142 execute a function of prompting the user to tune in on a frequency of RF signal sent from the external device 200a (RF connection) through RF input terminal 31a to select a receiving channel.

More specifically, when the user presses the menu key 2c of the remote controller 2, CPU 142 makes OSD circuit 10 add OSD data of the menu screen to the video signal and display the same on the display screen 11a for prompting the user to tune in on a frequency of RF signal sent from the external device 200a through RF input terminal 31a to select a receiving channel. CPU 142 sets the channel (for example, Channel 3, Channel 4) selected on the menu screen by operation of the remote controller 2 as a channel to be received by tuning in a frequency of RF signal sent from the external device 200a through RF input terminal 31a, and stores the selected channel on the nonvolatile memory 143b.

CPU 142 executes the setting program 144a whereby CPU 142 operates as a selecting unit and a channel selecting unit.

The detecting program 144b serves, for example, to make CPU 142 perform a function of making the connection detecting unit 33 detect or judge at a predetermined timing whether or not RF signal is input from RF input terminal 31a.

More specifically, for example, when the setting program 144a is executed and a condition of switching RF signal is set at the time when external-input switching operation is executed, CPU 142 makes the connection detecting unit 33 detect RF signal (for example, a synchronizing signal) sent from RF input terminal 31a at the time when the power supply is turned on, and outputs the detection result to the control unit 14. CPU 142 judges based on the detection result whether or not RF signal has been supplied from RF input terminal 31a, and records on RAM 143a the result of judgment as flag information indicating whether or not RF signal is supplied from RF input terminal 31a. Thereafter, CPU 142 further keeps making the connection detecting unit 33 execute the same process every predetermined interval (for example, every 3 seconds), and records on RAM 143a the flag information indicating whether or not RF signal has been detected, based on the detection result of RF signal sent from RF input terminal 31a. The flag information recorded on RAM 143a, indicating whether or not RF signal has been detected takes a value of "1", when it is determined that RF signal is sent from RF input terminal 31a, and when it is determined that RF signal is not sent from RF input terminal 31a, the flag information takes a value of "0". As will be described below, while an external-input switching program 144a is executed, CPU 142 timely refers to the flag information stored on RAM 143a.

CPU 142 executes the detecting program 144b, and cooperates with the connection unit 33, whereby CPU 142 works as a detecting unit.

In the case where the setting program 144a is executed whereby a condition of switching a channel of RF signal sent from RF input terminal 31a is set, and further the detecting program 144b is executed whereby RF signal sent from the RF input terminal 31a is detected, the external-input switching program 144c serves to make CPU 142 execute, upon execution of external-input switching operation, a function of tuning in a frequency of RF signal input from RF input terminal 31a to switch to a receiving channel and of switching to a video and/or audio signal sent from an input terminal (composite input terminal 31b, component input terminal 31c) other than RF input terminal 31a.

More specifically, when the user presses the input switching key 2b of the remote controller 2, an input operation signal is sent to the selector 32 through the control unit 14, in the case where the flag information, recorded on RAM 143a, indicating whether RF signal has been input or not, is set to "1".

The input operation signal is for switching to video and/or audio signals sent respectively from the external device 200a (RF connection), external device 200b (composite connection) and external device 200c (component connection.) Then, the selector 32 switches the input terminal to be connected with the selector 32 successively, from RF input terminal 31a, composite input terminal 31b, to component input terminal 31c, in response to the input operation signals.

CPU 142 executes the external-input switching program 144c, and cooperates with the selector 32 and input switching key 2b, whereby CPU 142 works as an external-input switching unit.

Figure 3:
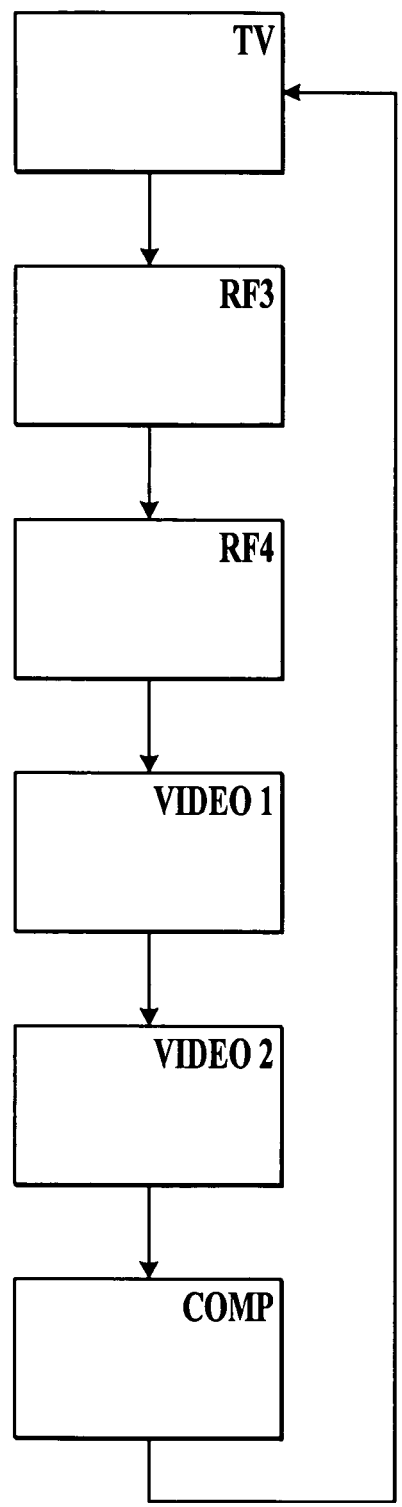
FIG. 3 is a view illustrating the first example of OSD-display, which is displayed on a display screen based on an external-input switching operation performed when an external-input switching program is executed.

FIG. 3 is a view illustrating, by way of example, OSD-display displayed on the display screen 11a, when the external-input switching program 144c is executed to perform external-input switching operation, in the case where the setting program 144a is executed, and thereby a condition has been set of switching a channel of RF signal sent from RF input terminal 31a, and further the detecting program 144b is executed, and thereby RF signal sent from RF input terminal 31a has been detected.

When the user presses the input switching key 2b, CPU 142 refers to the flag information, recorded on RAM 143a, identifying whether or not RF signal has been input. When the flag information is set to "1", CPU 142 switches the input terminals 31 to be connected with the selector 32 successively every operation of the input switching key 2b, in the order of "RF3->RF4->Video 1->Video 2->COMP, and so on". The input terminal 31 which is switched to be connected with the selector 32 by execution of the external-input switching operation is displayed on the display screen 11a, as shown in FIG. 3. For instance, "FR3" is displayed on the display screen 11a (OSD-display).

When RF input terminal 31a is selected to be connected with the selector 32, the tuner 5 mixes RF signal sent from the selected RF input terminal 31a with the local oscillation signal in the mixing circuit, and thereby RF signal falling within a frequency band corresponding to the tuned in channel is received in response to a control signal transferred from the control unit 14 for tuning in a frequency of the RF signal of a receiving channel (for example, Channel 3, Channel 4). Further, the video/audio processing unit 9 executes various video/audio processes on the received RF signal, and a video is displayed by the video output unit 11 based on the received RF signal sent from RF input terminal 31a, and also an audio is output from the audio output unit 12 based on the received RF signal sent from RF input terminal 31a.

Further, the external-input switching program 144c serves to make CPU 142 execute a function of switching to a video and/or audio signal sent from the input terminal 31 (for example, the composite input terminal 31b and component input terminal 31c) other than RF input terminal 31a upon execution of the external-input switching operation, when the setting program 144a is executed whereby a condition of not switching RF signal sent from RF input terminal 31a is set, or when the detecting program 144b is executed whereby RF signal input from RF input terminal 31a is detected.

More specifically, in the case where the flag information, recorded on RAM 143a, indicating whether RF signal has been input or not is set to "0", when the user presses the input switching key 2b of the remote controller 2, an input operation signal for switching to video and/or audio signals sent from the external device 200b (composite connection) and external device 200c (component connection) is transferred to the selector 32 from the control unit 14, and the selector 32 successively switches the input terminals to be connected with the selector 32 itself from the composite input terminal 31b to component input terminal 31c in response to the input operation signal.

Figure 4:
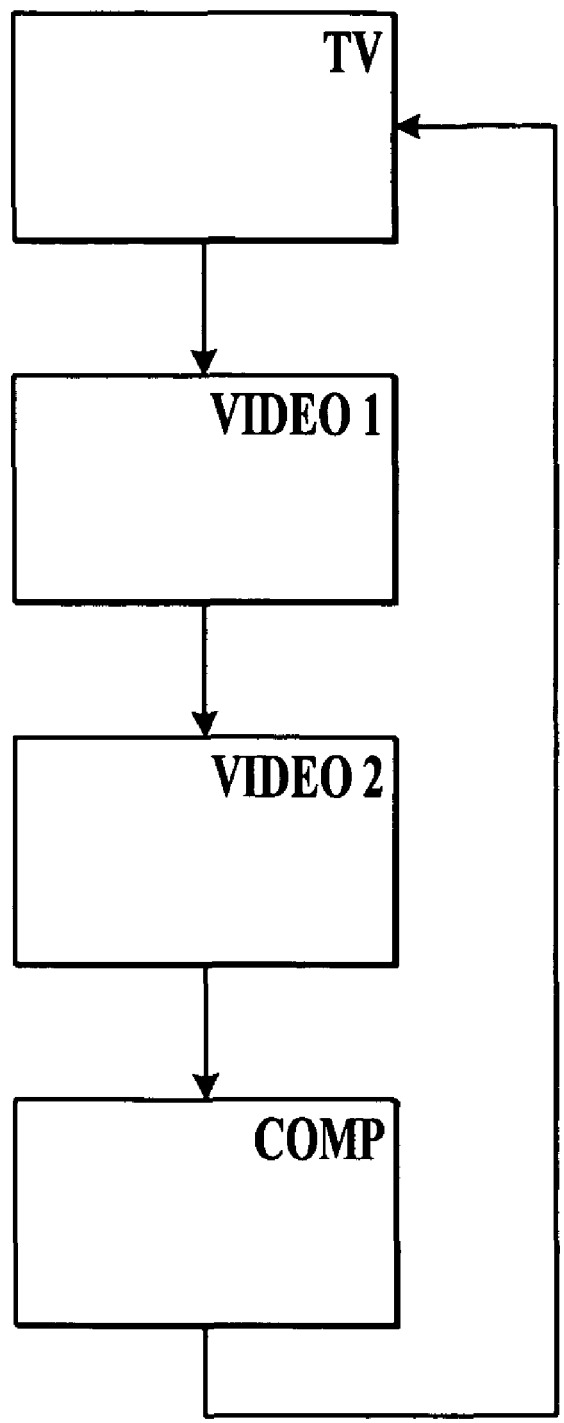
FIG. 4 is a view illustrating the second example of OSD-display, which is displayed on a display screen based on an external-input switching operation performed when an external-input switching program is executed.

FIG. 4 is a view illustrating, by way of example, OSD-display displayed on the display screen 11a, when the external-input switching program 144c is executed whereby external-input switching operation is performed in the case where the setting program 144a is executed whereby a condition is set not for switching a channel of RF signal from RF input terminal 31a, and further the detecting program 144b is executed whereby RF signal sent from RF input terminal 31a is detected.

When the input switching key 2b is pressed, CPU 142 refers to the flag information, recorded on RAM 143a, for indicating whether or not RF signal has been input. When the flag information is set to "0", CPU 142 successively switches the input terminals 31 to be connected with the selector 32 every operation of the input switching key 2b. CPU 142 switches the input terminals 31, for example, in the order of "Video 1->Video 2->COMP" and so on". The input terminals 31 which are successively connected with the selector 32 by execution of the external-input switching operation are displayed on the display screen 11a, as shown in FIG. 4. For instance, "Video 1" is displayed on the display screen 11a (OSD-display).

Figure 5:
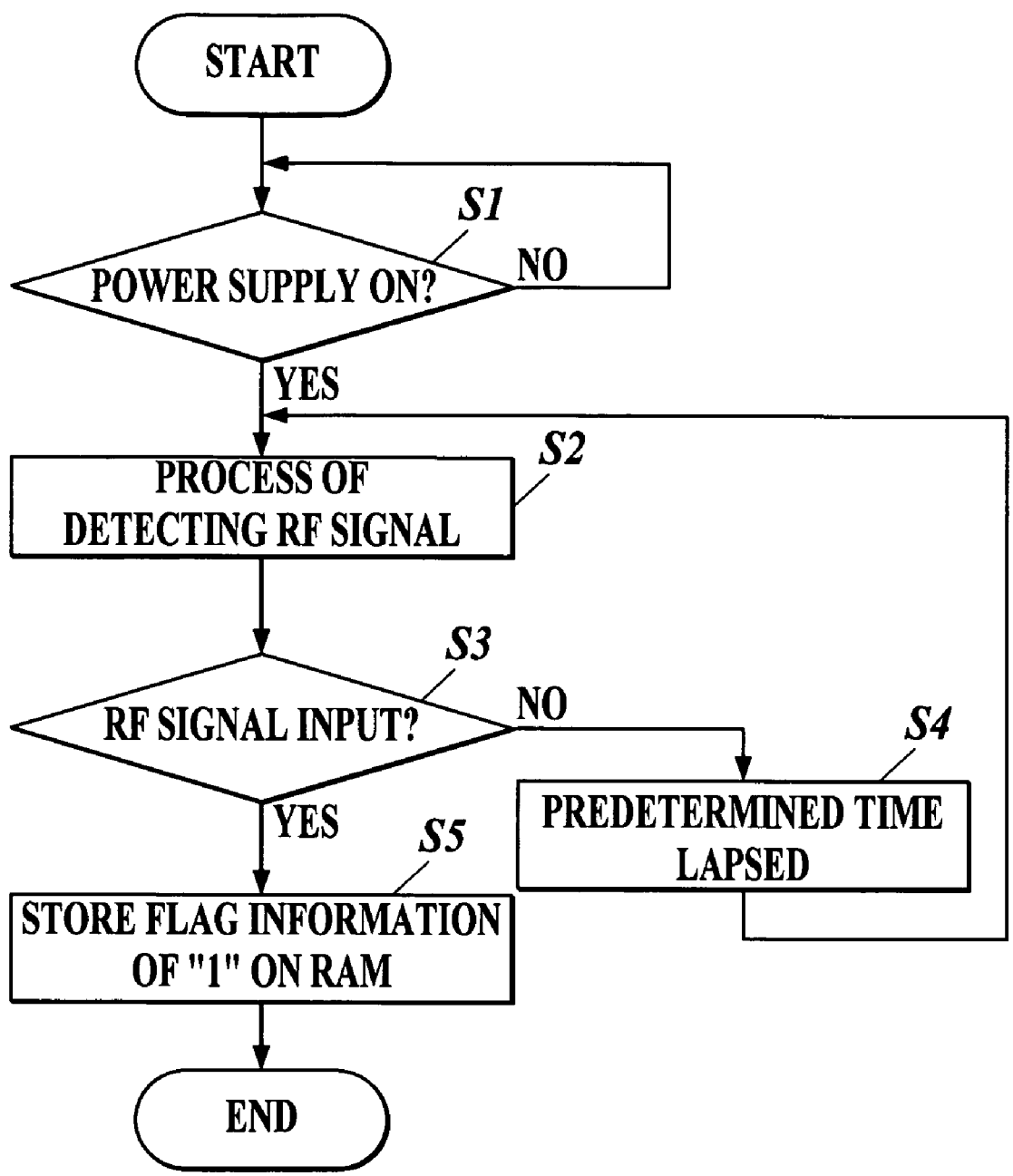
FIG. 5 is a flow chart of a detecting process performed in the receiving apparatus according to the present invention.

Next, a detecting operation performed by CPU 142 will be described with reference to a flow chart shown in FIG. 5.

The detecting operation is performed by CPU 142 in accordance with the detecting program 144b.

At step S1, CPU 142 judges whether the power supply has been turned on or not. It is assumed that the flag information identifying whether or not RF signal has been input is set to "0" at the time when the power supply is turned on. When it is determined at step S1 that the power supply is turned on (YES at step S1), a process is performed at step S2 for detecting RF signal sent from the external device 200a (RF connection) through RF input terminal 31a. CPU 142 judges at step S3 whether or not RF signal has been input. When CPU 142 determines at step S3 that RF signal has not been input (NO at step S3), CPU 142 returns to step 2 after a predetermined time (for example, 3 seconds) has lapsed at step S4. Meanwhile, when CPU 142 determines at step S3 that RF signal has been input (YES at step S3), CPU 142 stores temporarily on RAM 143a the flag information (for example, "1") indicating that RF signal has been input at step S5, and finishes the present operation.

As described above, in the television receiver 100 according to the present invention, CPU 142 executes the external-input switching program 144c whereby a frequency of RF signal input from RF input terminal 31a is tuned in to switch to a receiving channel, upon execution of external-input switching operation. Therefore, when data output from the external device 200 which outputs RF signal of video and/or audio signal is selected, the user is not required to perform any other operation to tune in on a frequency of RF signal separately to select a receiving channel. As a result, the user can select the receiving channel only by operating the input switching key 2b, and therefore an easy-to-use television receiver is provided.

Further, CPU 142 executes the detecting program 144b whereby it is judged at a predetermined timing whether or not RF signal has been sent from RF input terminal 31a. When it is determined that RF signal has been sent from RF input terminal 31a, the external-input switching program 144c is executed whereby a frequency of RF signal sent from the RF input terminal 31a is tuned in to switch to a receiving channel. As a result, it is possible to switch a channel only when necessary, and therefore, a user-friendly television receiver is provided.

Further, CPU 142 executes the setting program 144a and thereby, when the external-input switching program 144c is executed, the user is allowed to select and set whether or not a function has been given of tuning in a frequency of RF signal sent from RF input terminal 31a to switch a receiving channel. Further, the user is allowed to select and set a channel to be received by tuning in a frequency of RF signal input from the input terminal 31a, and therefore a user-friendly television receiver 100 is provided.

The present invention is by no means restricted in its scope to the above embodiments, and may be improved and/or altered in design as far as they fall within the scope of the purport of the present invention.

For instance, the television receiver 100 is described as the receiving apparatus according to the present invention but such receiving apparatus is not limited to the television receiver. Any apparatus which can be connected with the external device 200 may be used as the receiving apparatus according to the invention.

In the embodiment of the invention, the external devices 200b, 200c (first external devices) which are connected to the receiving apparatus of the invention through the external input terminals (composite input terminals 31b, component input terminal 31c) and the external devices 200a (second external devices) which is connected to the receiving apparatus of the invention through RF input terminals 31a are described as separate and independent devices, but as the external devices 200 may be used any external device which can be connected with the television receiver 100 through both external input terminals 31b, 31c and RF input terminals 31a.

Further, in the receiving apparatus of the present invention, it is detected or judged whether on not RF signal has been input from RF input terminal 31a. The receiving apparatus is arranged not to tune in on a frequency of RF signal input from RF input terminal 31a to switch to a receiving channel, when RF signal has not been detected. But the receiving apparatus may be arranged so as to tune in on a frequency of RF signal sent from RF input terminal 31a to switch to a receiving channel, even if RF signal has not been detected.

Further, the interface unit 3 may comprise external input terminals, such as S terminal and D terminal, in addition to RF input terminals 31a, composite input terminals 31b and component input terminal 31c discussed in the embodiment.

The external devices 200 which can be used together with the receiving apparatus of the invention are not limited to the external device 22b (composite connection) and/or external devices 200c (component connection) but any external device which outputs RGB signal may be used.

In the receiving apparatus of the invention, RF signal sent from RF input terminal 31a is detected at the time when the power supply is turned on and/or every predetermined interval after the power supply is turned on, but modification may be made such that the detecting process is performed at the time when a receiving channel is previously set.

Further, a signal which is sent from the external device may be either of an audio signal or a video signal.

What is claimed is:

1. A television receiver comprising:
an antenna to receive a television broadcast RF signal from a television broadcast station;
an external input terminal to receive a non-RF signal from a first external device, the non-RF signal being a video and/or audio signal which is not modulated into a radio frequency signal;
an RF input terminal to receive an RF signal from a second external device, the RF signal being a video and/or audio signal which is modulated into a radio frequency signal;
a detecting unit to judge at a predetermined timing whether or not the RF signal is received by the RF input terminal;
an external-input switching unit to switch between the antenna, the external input terminal, and the RF input terminal;
a display screen including: a television output screen on which an image of the television broadcast RF signal received by the antenna is displayed; an external input terminal output screen on which an image of the non-RF signal received by the external input terminal is displayed; and an RF input terminal output screen on which an image of the RF signal received by the RF input terminal is displayed, wherein when the external-input switching unit switches to the antenna, the external input terminal, or the RF input terminal, the external-input switching unit switches to the television output screen, the external input terminal output screen, or the RF input terminal output screen, respectively;
a tuner to tune to the RF signal when the RF signal is received by the RF input terminal so as to specify a receiving channel of the RF signal;
a selecting unit with which a user selects whether or not to allow the external-input switching unit to activate a function of switching to the RF input terminal to a predetermined receiving channel; and
a channel selecting unit with which the user selects the predetermined receiving channel, the RF signal of which is received by the RF input terminal, wherein
when the detecting unit judges that the RF signal is received by the RF input terminal, and the external-input switching unit is allowed to activate the function of switching to the RF input terminal by the user with the selecting unit, the external-input switching unit switches to the RF input terminal, thereby switching to the RF input terminal output screen on which the image of the predetermined receiving channel of the RF signal is displayed, the predetermined receiving channel being specified by the tuner.

2. A receiving apparatus comprising:
an antenna to receive a television broadcast RF signal from a television broadcast station;
an external input terminal to receive a non-RF signal from a first external device, the non-RF signal being a video and/or audio signal which is not modulated into a radio frequency signal;
an RF input terminal to receive an RF signal from a second external device, the RF signal being a video and/or audio signal which is modulated into a radio frequency signal;

an external-input switching unit to switch between the antenna, the external input terminal, and the RF input terminal;
a display screen including: a television output screen on which an image of the television broadcast RF signal received by the antenna is displayed; an external input terminal output screen on which an image of the non-RF signal received by the external input terminal is displayed; and an RF input terminal output screen on which an image of the RF signal received by the RF input terminal is displayed, wherein when the external-input switching unit switches to the antenna, the external input terminal, or the RF input terminal, the external-input switching unit switches to the television output screen, the external input terminal output screen, or the RF input terminal output screen, respectively; and
a tuner to tune to the RF signal when the RF signal is received by the RF input terminal so as to specify a receiving channel of the RF signal when the RF signal is being received by the RF input terminal and a user has previously specified a predetermined receiving channel for the RF input terminal.

3. The receiving apparatus as claimed in claim 2, further comprising:
a detecting unit to judge at a predetermined timing whether or not the RF signal is received by the RF input terminal, wherein
when the detecting unit judges that the RF signal is received by the RF input terminal, the external-input switching unit switches to the RF input terminal, thereby switching to the RF input terminal screen on which the image of the receiving channel of the RF signal is displayed, the receiving channel which is specified by the tuner.

4. The receiving apparatus as claimed in claim 2, further comprising a selecting unit with which a user selects whether or not to allow the external-input switching unit to activate a function of switching to the RF input terminal.

5. The receiving apparatus as claimed in claim 3, further comprising a selecting unit with which a user selects whether or not to allow the external-input switching unit to activate a function of switching to the RF input terminal.

6. The receiving apparatus according to claim 2, further comprising a channel selecting unit with which a user selects the receiving channel, the RF signal of which is received by the RF input terminal.

7. The receiving apparatus according to claim 3, further comprising a channel selecting unit with which the user selects the receiving channel, the RF signal of which is received by the RF input terminal.

8. The receiving apparatus according to claim 4, further comprising a channel selecting unit with which the user selects the receiving channel, the RF signal of which is received by the RF input terminal.

9. The receiving apparatus according to claim 5, further comprising a channel selecting unit with which the user selects the receiving channel, the RF signal of which is received by the RF input terminal.

10. The receiving apparatus according to claim 2, wherein the external-input switching unit includes an input switching key, and when the input switching key is pressed, the television screen, the external-input terminal screen, and the RF input terminal screen are switched in a predetermined order.

* * * * *